United States Patent [19]

Imura

[11] Patent Number: 5,463,210
[45] Date of Patent: Oct. 31, 1995

[54] IC CARD READER

[75] Inventor: Shigeru Imura, Tokyo, Japan

[73] Assignee: Sony Corporation, Tokyo, Japan

[21] Appl. No.: 141,886

[22] Filed: Oct. 22, 1993

[30] Foreign Application Priority Data

Oct. 28, 1992 [JP] Japan .................. 4-290236

[51] Int. Cl.[6] .................. G06K 7/06; H01R 3/00
[52] U.S. Cl. .................. 235/441; 235/492; 439/489
[58] Field of Search .................. 235/441, 435, 235/492; 439/489, 490, 630, 924

[56] References Cited

U.S. PATENT DOCUMENTS

| | | | |
|---|---|---|---|
| 4,767,918 | 8/1988 | Kushima et al. | 235/441 |
| 4,785,166 | 11/1988 | Kushima | 235/441 |
| 4,849,615 | 7/1989 | Mollet | 235/441 X |
| 4,849,944 | 7/1989 | Matsushita | 439/924 X |
| 4,914,281 | 4/1990 | Benton et al. | 235/492 |
| 5,034,599 | 7/1991 | Hirata | 235/438 |
| 5,051,566 | 9/1991 | Pernet | 235/441 |
| 5,070,234 | 12/1991 | Ishii et al. | 235/492 X |
| 5,080,613 | 1/1992 | Orui et al. | 439/924 X |
| 5,088,931 | 2/1992 | Niciolo et al. | 439/924 X |
| 5,286,957 | 2/1994 | Defrasne | 235/441 |
| 5,334,827 | 8/1994 | Bleier et al. | 235/441 X |

FOREIGN PATENT DOCUMENTS

| | | | |
|---|---|---|---|
| 4058385 | 2/1992 | Japan | 235/441 |
| 2210717 | 6/1989 | United Kingdom . | |

*Primary Examiner*—Donald Hajec
*Assistant Examiner*—Jeffrey R. Filipek
*Attorney, Agent, or Firm*—Lise A. Rode; Robert P. Biddle; Jerry A. Miller

[57] ABSTRACT

An IC card loading detecting apparatus utilizing an input/output terminal portion of an IC card which houses therein a central processing unit (CPU) has a ground contact (6e) and a detection sensor contact (7) provided on an interface portion (6) of a terminal equipment (4). The detection sensor contact is brought in contact with a ground terminal (2e) of an input/output terminal portion (2) of an IC card (1) after the ground contact is brought in contact with the ground terminal when the IC card is inserted into the equipment and is disconnected from the ground terminal before the ground contact is disconnected from the ground terminal when said IC card is ejected from the equipment.

3 Claims, 5 Drawing Sheets

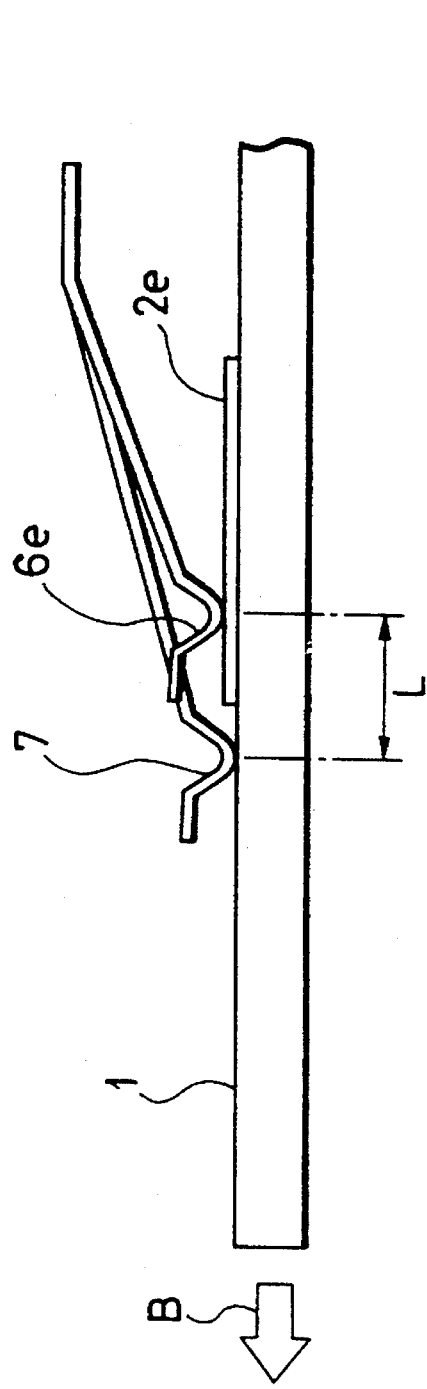
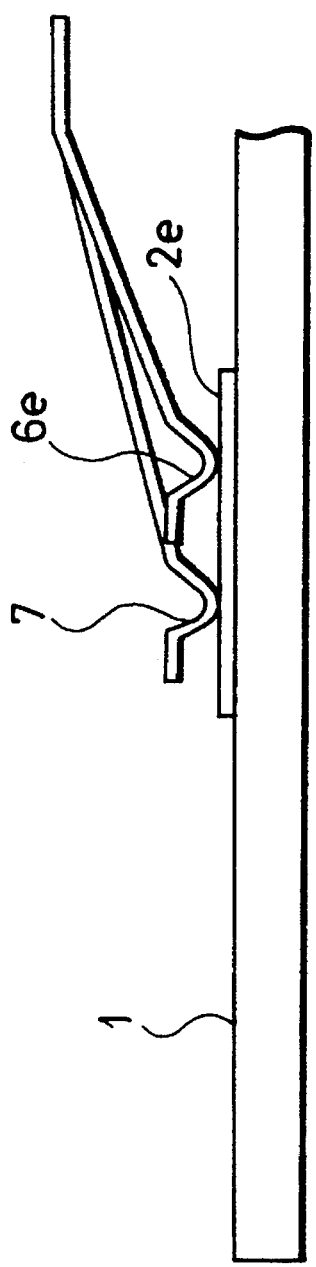
FIG. 5A
FIG. 5B

IC CARD READER

BACKGROUND OF THE INVENTION

1. Field of the Invention

The present invention relates to an IC card loading detecting apparatus that can detect by simple means whether or not an IC card housing therein a CPU circuit is loaded on a terminal equipment.

2. Description of the Prior Art

Recently, pocket telephones have just started using IC cards housing therein a CPU (central processing unit) circuit. In this system, algorithms, memories of data and telephone numbers of telephone subscribers or the like are stored in the IC card. Inasmuch as the telephone subscriber uses the same IC card with any pocket telephones, then the IC card user has to pay for such telephone rate for each calling. In the portable telephone using the IC card, the IC card must be loaded onto the portable telephone reliably.

An example of a conventional IC card housing therein the above-mentioned CPU circuit will be described with reference to FIG. 1. As shown in FIG. 1 of the accompanying drawings, there is provided an IC card which is generally depicted by reference numeral 1. The IC card 1 houses therein a CPU formed of a ROM (read-only memory serving as a program memory), not shown and a RAM (random access memory serving as a data processing memory), not shown and an EEPROM (electrically erasable and programmable ROM serving as a data memory), not shown. The IC card 1 includes on its surface an input/output terminal unit 2 formed of a plurality of terminal groups in order to transmit and receive signals to and from an interface unit of terminal equipments, which will be described later on.

The above-mentioned input/output terminal unit 2 is placed on the IC card 1 at a predetermined position defined by the ISO (International Organization for Standardization) standards. The input/output terminal unit 2 is formed of two columns, each including four terminals. Respective terminals are depicted by reference numerals 2a to 2h and will be described in detail below. The terminal 2a is a VCC terminal (i.e., terminal to which an operation voltage of CPU housed in the IC card is supplied), the terminal 2b is an RST terminal (i.e., terminal to which a reset signal of CPU housed in the IC card is supplied), the terminal 2c is a CLK terminal (i.e., terminal to which an operation clock of CPU housed in the IC card is supplied), the terminal 2d is an RFU terminal (i.e., auxiliary terminal), the terminal 2e is a GND (ground) terminal, the terminal 2f is a VPP terminal (i.e., terminal to which a write voltage of memory IC is supplied), the terminal 2g is an I/O terminal (i.e., bidirectional data transmission terminal), and the terminal 2h is an RFU (i.e., auxiliary terminal). The IC card 1 includes a magnetic stripe 3 formed on its front surface and the IC card 1 is inserted into the terminal equipment along the direction shown by an arrow A.

A conventional method of detecting whether or not the IC card 1 is loaded on the terminal equipment will be described next with reference to FIG. 2.

As shown in FIG. 2, when the IC card 1 is inserted into a terminal equipment 4 through its insertion slot 4a, the IC card 1 presses a microswitch 5 at its contact member 5a provided in the terminal equipment 4 to turn on the microswitch 5, thereby making it possible to confirm that the IC card 1 is loaded on the terminal equipment 4 at its predetermined position. Under the condition that the IC card 1 is loaded on the terminal equipment 4, the respective terminals 2a through 2h of the input/output terminal unit 2 on the IC card 1 are electrically brought in contact with contacts 6a though 6h formed of spring members provided on an interface unit 6 of the terminal equipment 4 respectively as shown in FIG. 3 to thereby effect transmission and reception of signals between the CPU circuit of the IC card 1 and the terminal equipment 4.

When the loading of the IC card 1 on the terminal equipment 4 is detected by the above-mentioned arrangement, the microswitch 5 is used as a detection device so that assembly parts which are thicker than the IC card 1 are required in addition to the interface unit 6 that is needed to operate the IC card 1. If an apparatus itself which uses the IC card 1 as a part of its system application is large in size, then it is natural that a ratio between the IC card 1 and the interface unit 6 of the terminal equipment 4 occupies the whole area of the apparatus should be reduced. In portable equipments such as a pocket telephone or the like, products that are miniaturized to the pocket size must be taken into consideration. However, if a communication system itself becomes digitized, then a ratio that the circuits necessary for effecting the communication occupy the whole of the portable equipment is unavoidably increased. As a consequence, the mechanism portion such as the IC card and the interface unit is limited, in particular, in the thickness direction so that the portable equipment cannot be miniaturized substantially according to the above-mentioned conventional system.

Instead of the above mentioned microswitch, there is utilized a photo-interrupter device formed of a combination of a photo-diode and a light emitting diode as other detecting means. In this photo-interrupter device, the light emitting diode is energized by a current to emit a light and the photo-diode senses such emitted light. More specifically, during the photo-diode is energized, its forward resistance is low. If the photo-diode is disturbed in sensing a light, its forward resistance is changed and becomes high. Therefore, it becomes possible to detect the loading state of the IC card by effectively utilizing the above-mentioned features of the photo-interrupter.

On the other hand, there is proposed a detection method that does not need the above microswitch and photo-interrupter, i.e., detection method based on a software. A communication protocol between the IC card and a terminal equipment (host) utilizing the IC card is standardized by 7816-3 in the ISO standards. According to this detection method, the host apparatus determines regularly by utilizing a communication protocol whether or not the IC card is reliably loaded onto the interface portion of the host apparatus and whether or not an answer is normal. This method needs no parts separately but needs an operation electric power to regularly check whether or not the IC card is reliably loaded onto the interface portion and whether or not the answer is normal.

However, since the pocket-size portable telephone is small in size and limited in capacity of a battery that can be attached thereto, such pocket-size telephone takes every possible means for extending a communication time with a small electric power. Operation for checking whether or not the IC card is loaded onto the interface portion of the host apparatus must be frequently carried out during the communication in order to prevent the illegal use of the pocket telephone and the telephone line network. An electric power consumed by such checking fosters the reduction of the communication time.

For the above-mentioned reason, the conventional IC card loading detecting means cannot be applied to the small-sized portable telephone substantially.

SUMMARY OF THE INVENTION

In view of the aforesaid aspects, according to the present invention, it is an object of the present invention to provide an IC card loading detecting apparatus which can make the pocket telephone become miniaturized and thin by utilizing an input/output terminal portion of an IC card housing therein a CPU circuit and a simple detecting means provided in an interface portion of a terminal equipment.

In order to achieve the aforesaid object, according to the present invention, there is provided an IC card loading detecting apparatus which detects the loading of the IC card having a CPU circuit and a plurality of input/output terminal portions for transmitting and receiving a signal between the CPU circuit and an interface portion of a terminal equipment. This IC card loading detecting apparatus detects the presence or absence of IC card by using a means for causing a detection sensor contact provided on the interface portion to be electrically brought in contact with the input/output terminal portion as an IC card detecting means.

In the IC card loading detecting apparatus of the present invention thus arranged, when the IC card is loaded onto the terminal equipment, the detection sensor contact provided on the interface portion of the terminal equipment is electrically brought in contact with the input/output terminal portion of the IC card so that the loading of the IC card on the terminal equipment can be detected by the CPU circuit housed in the terminal equipment.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 5A and 5B are side views used to explain the state that a detection sensor contact and a ground contact are brought in contact with an IC card terminal, respectively;

DETAILED DESCRIPTION OF THE PREFERRED EMBODIMENT

An IC card loading detecting apparatus according to an embodiment of the present invention will hereinafter be described with reference to the drawings.

Figure 1:
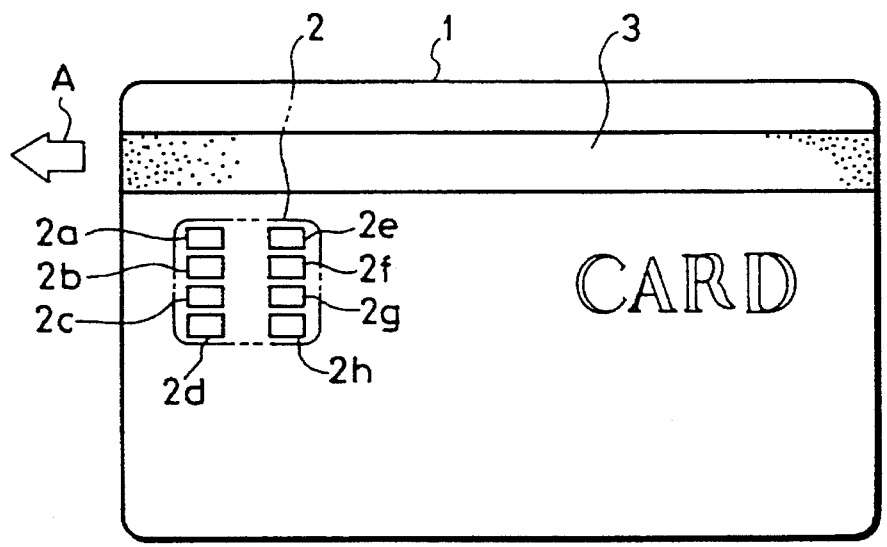
FIG. 1 ms a plan view showing a conventional IC card.
Figure 2:
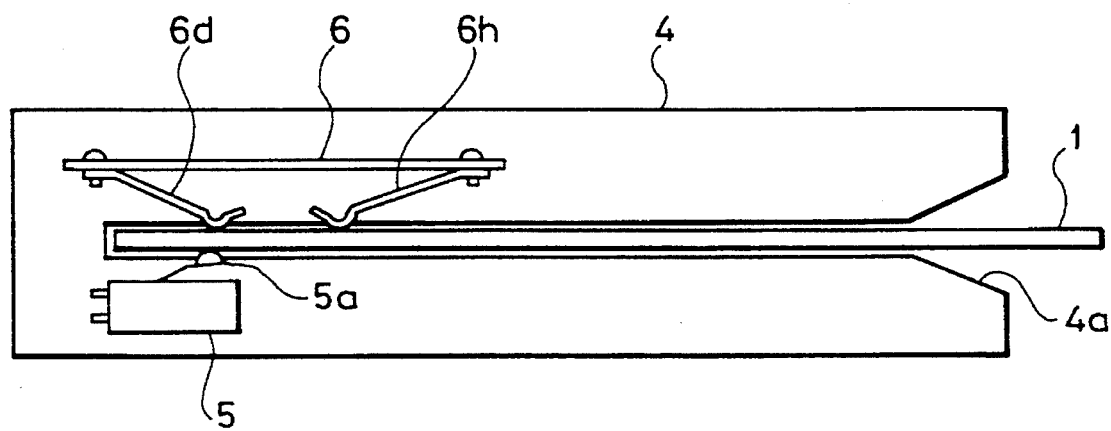
FIG. 2 is a schematic cross-sectional side view showing an arrangement of a conventional IC card loading detecting apparatus.
Figure 3:
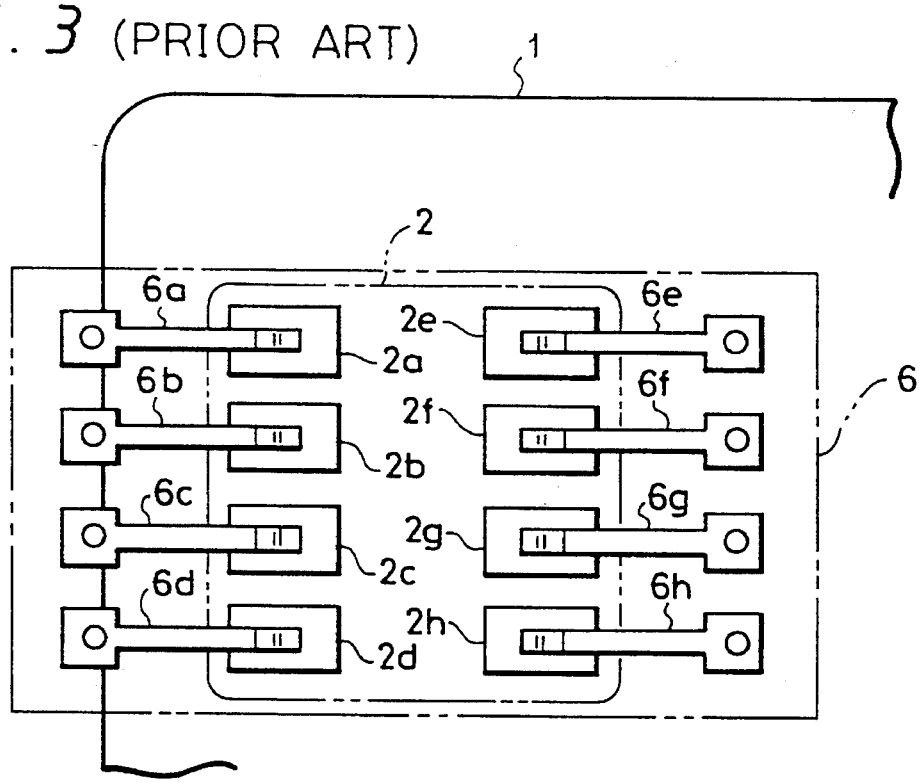
FIG. 3 is a plan view showing a contact state between the input/output terminal unit of the IC card and the interface unit of the terminal equipment according to the prior art.
Figure 4:
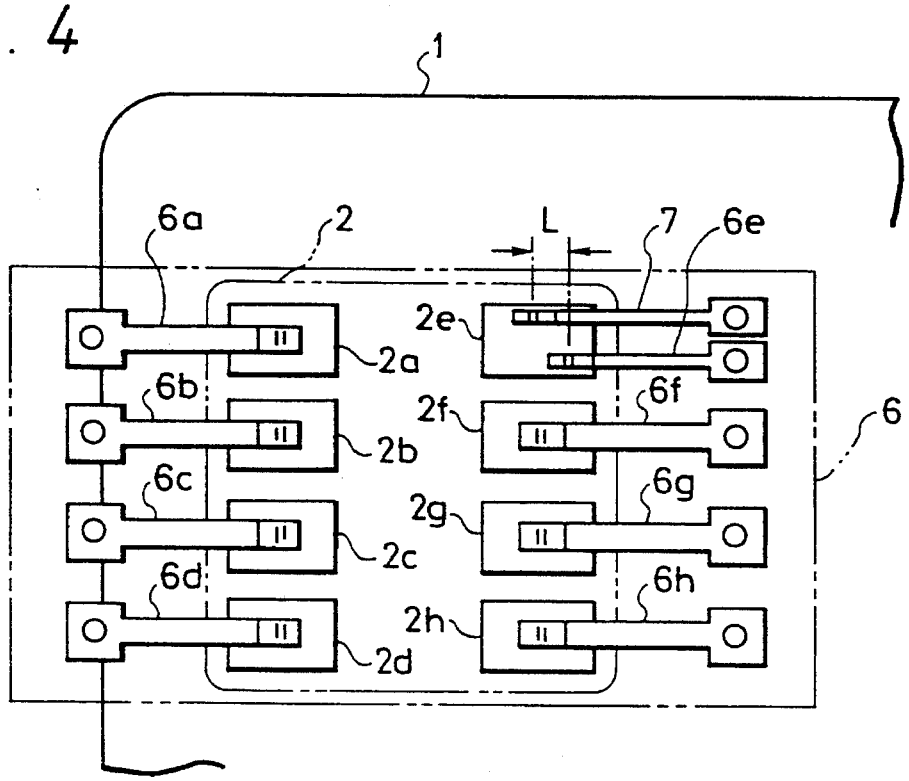
FIG. 4 is a plan view showing an IC card loading detecting apparatus according to an embodiment of the present invention and illustrating the state that IC card terminals and terminal equipment terminals are brought in contact with one another.

FIG. 4 is a plan view showing the condition that the terminals 2a through 2h of the input/output terminal unit 2 of the IC card 1 are electrically brought in contact with the contacts 6a through 6h of the interface unit 6 of the terminal equipment 4 (not shown), respectively.

In this case, as a detecting means of the IC card loading detecting apparatus according to the present invention, there is utilized the ground terminal 2e of the input/output terminal unit 2. Although the ground terminal 2e is electrically brought in contact with the original ground contact 6e provided in the interface unit 6 of the terminal equipment 4, with respect to the ground terminal 2e that is brought in contact with the ground terminal 6e as described above, there is provided a detection sensor contact 7 on the interface unit 6 in order to detect the loading of the IC card 1 on the terminal equipment 4.

One of the most specific features of the present invention lies in that the detection sensor contact 7 is disposed such that the contact position between the ground terminal 2e and the ground contact 6e is displaced a little to the insertion direction side of the IC card 1 so as to have a difference L between the contact position of the ground contact 6e and the ground terminal 2e and that of the detection sensor contact 7 and the ground terminal 2e. The reason for this is that, when the IC card 1 is inserted into the terminal equipment 4, the detection sensor contact 7 must be brought in contact with the ground terminal 2e with a time difference corresponding to the difference L with respect to the direction in which the IC card 1 is translated as shown by an arrow B.

Figure 6:
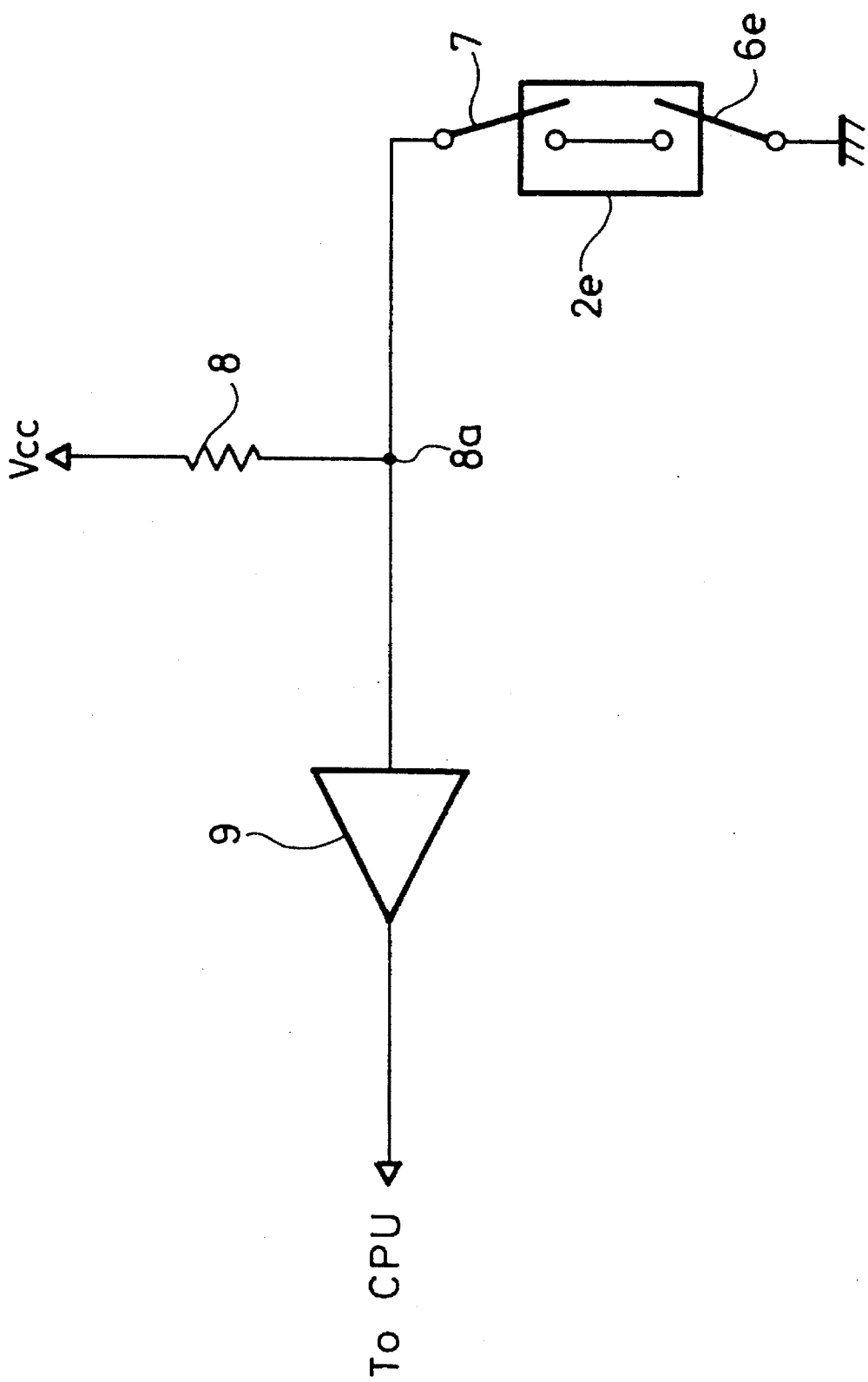
FIG. 6 is a diagram showing a circuit for operating the detection sensor contact and the ground contact.

The detection sensor contact 7 and the ground contact 6e having the above-mentioned contact structures are connected to a circuit configuration shown in FIG. 6. A pullup resistor 8 acts to maintain a terminal portion 8a at high "H" level (Vcc or 5V) when the detection sensor contact 7 is in its off state. This high "H" level is supplied as a signal that is output through a TTL (transistor transistor logic) buffer 9 to a CPU of the host or the like.

A relationship between operation of the detection sensor contact 7, the ground contact 6e and the TTL buffer 9 will be described with reference to FIGS. 5A, 5B and FIGS. 7A, 7B.

Figure 7A:
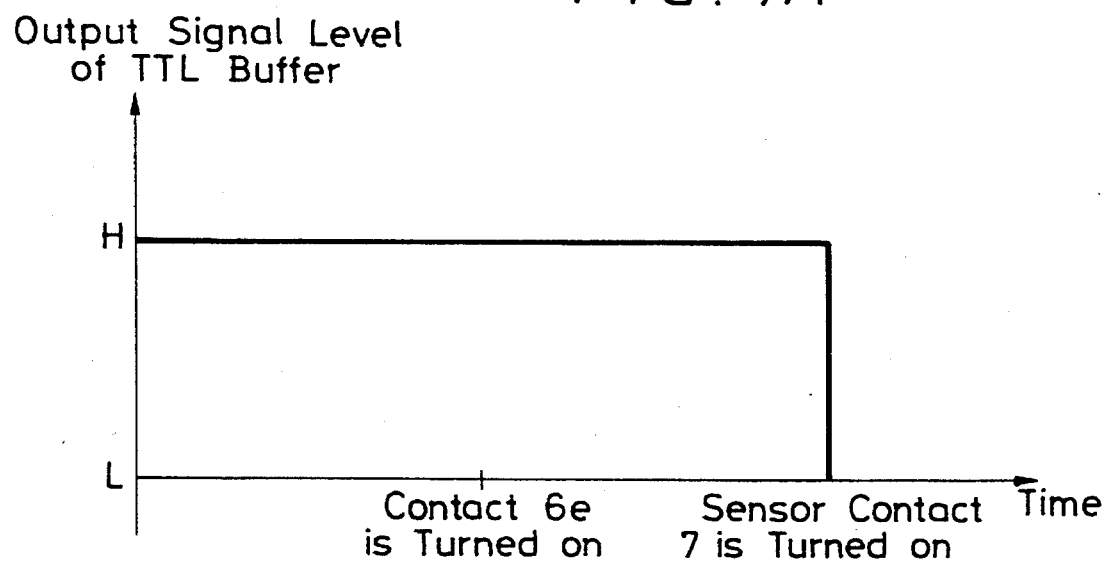
FIGS. 7A and 7B are diagrams of waveforms used to explain a relationship among the detection sensor contact, the ground contact and a TTL buffer, respectively.

When the IC card 1 is inserted into the interface 6 of the terminal equipment 4, the ground contact 6e of the interface 6 in the terminal equipment 4 is brought in contact with the ground terminal 2e of the IC card 4 and thereby turned on. Then, the detection sensor contact 7 is brought in contact with the ground terminal 2e and thereby turned on with a certain time difference relative to the ground contact 6e as shown in FIG. 7A. Conversely, when the IC card is ejected from the terminal equipment 4, the detection sensor contact 7 is initially turned off and then the ground contact 6e is turned off with a certain time difference as shown in FIG. 7B.

Figure 7B:
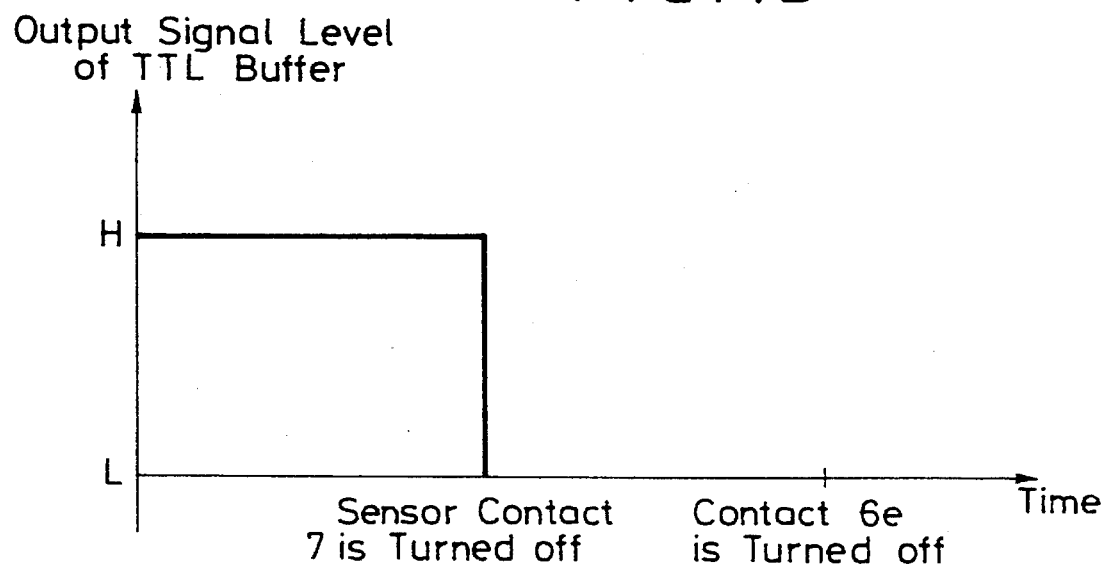

At that time, the output signal level of the TTL buffer 9 is changed respectively as shown in FIGS. 7A, 7B. When the IC card 1 is inserted into the terminal equipment 4, it is important that the ground contact 6e is first brought in contact with the ground terminal 2e, which can prevent an electrical shock exerted upon the IC card 1 when the IC card 1 is electrically brought in contact with the host (i.e., conduction for energizing the IC card after the contact was brought in contact with the terminal, etc.).

Since the IC card loading detecting apparatus of the present invention utilizes the ground terminal 2e of the input/output terminal unit 2 of the IC card 1 and it is determined by the detection sensor contact 7 provided on the interface unit 6 of the terminal equipment 4 whether or not the IC card 1 is loaded on the terminal equipment 4, the number of assembly parts of the IC card loading detecting apparatus can be reduced to make the IC card loading detecting apparatus become inexpensive. Also, the IC card reader of the present invention can be miniaturized and an electric power of this IC card loading detecting apparatus can be saved.

Further, when the IC card 1 is ejected from the terminal equipment 4, the detection sensor contact 7 is turned off prior to the de-energizing of the ground contact 6e as shown in FIG. 7B, whereafter the contact state of the detection sensor contact 7 of the IC card 1 is interrupted. In general, the terminal equipment writes necessary information in the IC card when the telephone communication is ended before the IC card is ejected from the terminal equipment and then the electrical connection is ended. Thereafter, the user ejects the IC card 1 from the terminal equipment 4.

It is frequently observed that illegal users of IC card eject the IC card from the terminal equipment before the telephone conversation is not ended in an ordinary manner so that information concerning telephone conversation is not written in the IC card as if there was not such telephone conversation. According to the present invention, the electrical connection between the IC card 1 and the terminal equipment 4 is maintained until the ground terminal 6e of the terminal equipment 4 is disconnected from the ground terminal 2e of the IC card 1. Therefore, there is a time that the electrical connection between the IC card 1 and the terminal equipment 4 is interrupted after it had been detected by the detection sensor contact 7 of the terminal equipment 4 that the IC card 1 was ejected from the terminal equipment 4. This extra time can provide a time for processing the illegal operation within the terminal equipment 4. Accordingly, it becomes possible to inform operators who process data for the IC card itself or hold the communication line network of the existence or occurrence of illegal use. Therefore, the IC card loading detecting apparatus of the present invention can maintain a higher communication security effectively.

While the contact and non-contact of the detection sensor contact 7 of the terminal equipment 4 with the ground terminal 2e of the input/output terminal portion 2 of the IC card 1 are effectively utilized as described above, the present invention is not limited thereto and other terminals, such as the auxiliary terminals also can be utilized effectively.

As described above, according to the present invention, there is provided an IC card loading detecting apparatus which includes a CPU circuit and a plurality of input/output terminal portions for transmitting and receiving a signal between the CPU circuit and the interface unit of the terminal equipment. As the IC card loading detecting means, there is employed the means that detects the loading of the IC card by causing the detection sensor contact provided on the interface unit to be electrically brought in contact with the input/output terminal unit. Therefore, the number of assembly parts can be reduced to thereby reduce the manufacturing cost of the apparatus. Also, the whole of the IC card loading detecting apparatus can be miniaturized. Particularly, the IC card loading detecting apparatus can be reduced in thickness and an electric power thereof can be saved.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An IC card loading detecting apparatus for reading an IC card, comprising:

an IC card including a central processing unit (CPU) housed therein and a plurality of input/output terminal portions for transmitting and receiving a signal between said CPU circuit and an interface unit of an equipment;

means for detecting a presence of said IC card by electrically contacting a detection sensor contact provided on said interface unit to a ground terminal of said input/output terminal portions, wherein said detection sensor contact is brought in contact with said ground terminal of said input/output terminal portions together with a ground contact of said interface unit to thereby detect the presence of said IC card.

2. The IC card loading detecting apparatus according to claim 1, wherein said detection sensor contact is brought in contact with said ground terminal a preselected time after said ground contact is brought in contact with said ground terminal when said IC is inserted into said equipment.

3. The IC card loading detecting apparatus according to claim 1, wherein said detection sensor contact is disconnected from said ground terminal a preselected time before said ground contact is disconnected from said ground terminal when said IC card is ejected from said equipment.

\* \* \* \* \*